United States Patent [19]

Matsumoto

[11] Patent Number: 4,752,896

[45] Date of Patent: Jun. 21, 1988

[54] ULTRASONIC IMAGING DEVICE

[75] Inventor: Kenzo Matsumoto, Tokyo, Japan

[73] Assignee: Kabushiki Kaisha Toshiba, Kawasaki, Japan

[21] Appl. No.: 654,462

[22] Filed: Sep. 26, 1984

[30] Foreign Application Priority Data

Sep. 28, 1983 [JP] Japan .................. 58-179552

[51] Int. Cl.$^4$ ............ G06F 15/42; G03B 42/06; G01N 9/24
[52] U.S. Cl. ................... 364/521; 364/413; 73/625; 367/7
[58] Field of Search ........... 73/618, 619, 624, 625, 73/626; 364/413, 414, 415, 518, 521; 367/7, 8

[56] References Cited

U.S. PATENT DOCUMENTS

| | | | |
|---|---|---|---|
| 4,005,258 | 1/1977 | Dory | 73/607 X |
| 4,023,175 | 5/1977 | Brown et al. | 367/11 X |
| 4,254,662 | 3/1981 | Kuroda et al. | 73/626 |
| 4,257,278 | 3/1981 | Papadofrangakis et al. | 73/861.25 |
| 4,351,038 | 9/1982 | Alais | 73/626 X |
| 4,409,839 | 10/1983 | Taenzer | 73/625 |
| 4,417,475 | 11/1983 | Okazaki | 73/626 X |
| 4,434,658 | 3/1984 | Miyazaki et al. | 73/618 |
| 4,481,822 | 11/1984 | Kubota et al. | 73/626 X |
| 4,491,020 | 1/1985 | Chubachi | 73/618 X |
| 4,495,817 | 1/1985 | Hunt et al. | 73/624 |
| 4,511,998 | 4/1985 | Kanda et al. | 73/618 X |
| 4,553,437 | 11/1985 | Luthra | 73/626 X |
| 4,570,488 | 2/1986 | Miwa et al. | 73/626 |
| 4,580,451 | 4/1986 | Miwa et al. | 73/626 |
| 4,586,135 | 4/1986 | Matsumoto | 73/625 X |
| 4,596,145 | 6/1986 | Smith et al. | 73/626 |
| 4,597,292 | 6/1986 | Fujii et al. | 73/626 |
| 4,611,494 | 9/1986 | Uchiyama | 73/626 |
| 4,662,223 | 5/1987 | Riley et al. | 73/626 |

OTHER PUBLICATIONS

Gebhardt, W., "Defect Reconstruction and Classification by Phased Arrays", *Materials Evaluation*, Jan. 1982, pp. 90–94.

S. Umemura et al., "Study of Real-Time Dynamic Focus Employing A/D Conversion", *Japan Society of Altrasonics in Medicine Proceedings* (Dec. 1982), p. 581.

*Primary Examiner*—Parshotam S. Lall
*Assistant Examiner*—Joseph L. Dixon
*Attorney, Agent, or Firm*—Foley & Lardner, Schwartz, Jeffery, Schwaab, Mack, Blumenthal & Evans

[57] ABSTRACT

An ultrasonic imaging device includes an ultrasonic probe with a plurality of vibrators arranged linearly for transmitting ultrasonic beams to an object and receiving the reflected ultrasonic beams from the object. A driving unit is constructed to control the plurality of vibrators using a time control which employs delay lines to transmit ultrasonic beams to the object in a convergent manner and to receive diverging ultrasonic beams from the object. The ultrasonic imaging device further includes a processing unit for processing the signals from the probe to obtain the reconstruction data and a display unit for displaying the reconstruction data. Since the ultrasonic beams are transmitted using the plurality of vibrators, the transmitted ultrasonic beams are strong; therefore improving the SN ratio.

11 Claims, 4 Drawing Sheets

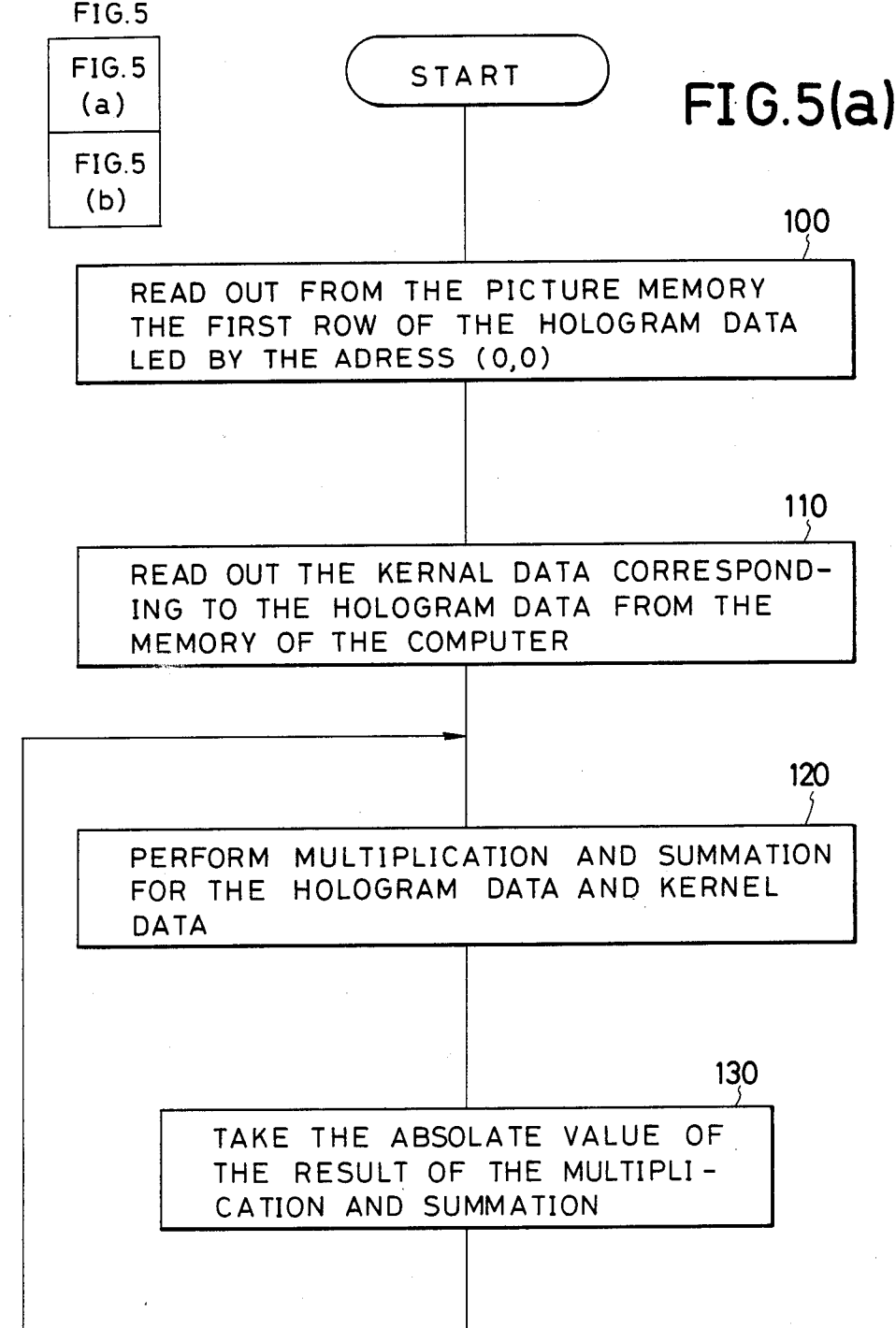

ULTRASONIC IMAGING DEVICE

BACKGROUND OF THE INVENTION

1. Field of the Invention

The present invention refers to an ultrasonic imaging device which makes it possible to obtain an ultrasonic image with high resolving power over a wide range of imaging object region.

2. Description of the Prior Art

As an ultrasonic imaging device which has been known in the past, there is an ultrasonic imaging device of linear electronic scanning type. This device has a large number of slender quadrature vibrators arranged in a line, and the required directivity is provided by driving the vibrators. In a device of the above description, a method has been employed in which the time control of the transmission and reception system has been carried out by means of the delay lines, and an improvement in azimuthal resolution has been accomplished by converging the distributions of the ultrasonic beam and the distribution of the reception sensitivity. Moreover, in order to converge the distributions of the ultrasonic beam and the reception sensitivity over a wider range, the multi-stage focusing method has been used in which the focal point is switched in succession.

However, in a method like the above, the switching of the focal point has to be done many times in order to obtain a high resolution over a wide range in the distance direction, namely the transmission direction of the ultrasonic beam. This gives rise to problems such as the prolongation of the time required for the operation, complication in the delay line system used for converging the ultrasonic beam, and the like.

On the other hand, there is known another method, the synthetic aperture method, for obtaining high resolution. According to the synthetic aperture method, an ultrasonic beam with spread greater than a predetermined value is radiated from the vibrators to the region of the object to be imaged, and the reflected waves from the object are received by the vibrators with sensitivity distribution greater than a certain value. Then, the received signals are phase detected in order to obtain the quadrature signals relating to the object, namely, the holograms. The data relating to the reconstruction of the object is obtained by carrying out the aperture synthesis operation using the hologram signals and the kernel signals.

According to the above method, high resolution can be obtained over a wide range. However, due to the fact that small vibrators have to be used in order to obtain an ultrasonic beam and the distribution of the reception sensitivity that have spreads greater than certain values, the received signals become weak, giving rise to a reduction in the SN ratio.

SUMMARY OF THE INVENTION

An object of the present invention is to provide an ultrasonic imaging device which has a high resolution over a wide range and a satisfactory SN ratio.

Another object of the present invention is to provide an ultrasonic imaging device which has a high resolution over a wide range in the transmission direction of the ultrasonic beam.

Still another object of the present invention is to provide an ultrasonic imaging device which can radiate a strong ultrasonic beam.

A further object of the present invention is to provide an ultrasonic imaging device which can obtain a strong image signal.

In order to achieve the above objects, the ultrasonic imaging device according to the present invention includes an ultrasonic transmission and reception apparatus which transmits ultrasonic waves and receives the reflect ultrasonic waves from the object.

The ultrasonic transmission and reception apparatus drives and controls a plurality of the vibrators so as to converge either one of the transmitted ultrasonic waves or the received waves and to diverge the other, non-converging waves. The ultrasonic imaging device further includes a processing circuit for processing the received reflected signals that come from the ultrasonic transmission and reception apparatus, based on the aperture synthesis method, in order to obtain the data for reconstruction of the image of the object.

BRIEF DESCRIPTION OF THE DRAWING

These and other objects, features and advantages of the present invention will be more apparent from the following description of a preferred embodiment taken in conjunction with the accompanying drawing in which.

DESCRIPTION OF THE PREFERRED EMBODIMENTS

Figure 1:
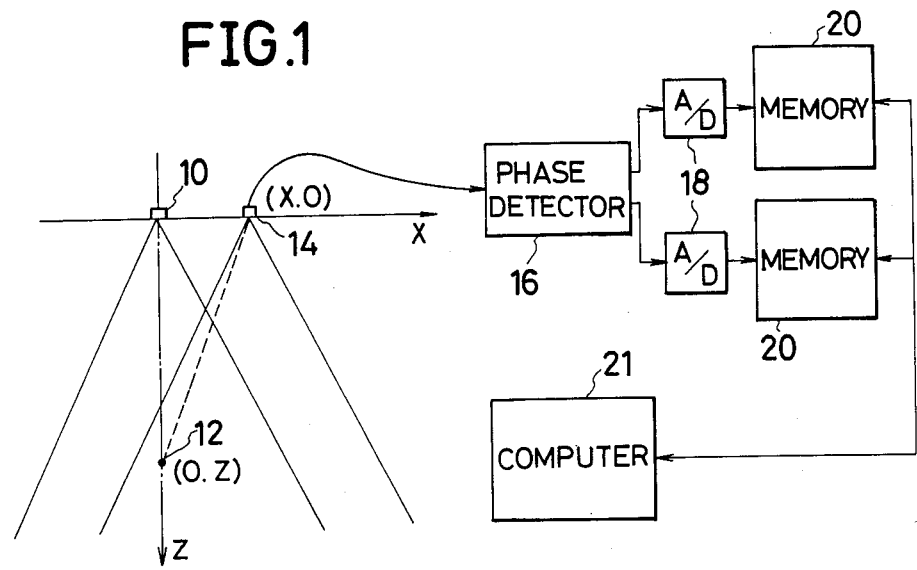
FIG. 1 is a simplified diagram for explaining the scanning principle in a prior art aperture synthetic method.

To facilitate the understanding of the present invention, a brief reference will be made to prior art for the scanning principle in the aperture synthesis method illustrated in FIG. 1.

As shown, the device has a relatively small ultrasonic vibrator 10, and an ultrasonic beam with a spread greater than a prescribed value is radiated toward the object from the vibrator 10. The reflected wave from the object 12 is received by a vibrator 14 with a sensitivity distribution that has a spread greater than a prescribed value. The received signal is phase detected by a phase detector 16, and a hologram relating to the object is obtained. The hologram signals are sent to the computer 21 via A/D converters 18 and memories 20. In the computer 21, the aperture synthesis operation is carried out for obtaining the data for reconstruction.

Although the existing aperture synthesis method described in the foregoing is practical, it includes a weakness in that it decreases the SN ratio during scanning, as was mentioned earlier.

The present invention is successful to eliminate the problems like the ones described in the foregoing, will be explained with reference to FIG. 2 through 5.

Figure 2:
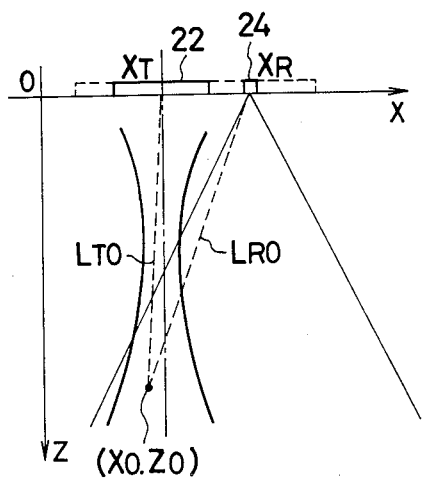
FIGS. 2 and 3 are simplified diagrams describing the scanning principle in the embodiments of the present invention.

To begin, there will be explained the scanning principle of ultrasonic wave for the ultrasonic imaging device in accordance with the present invention. In this scanning of the ultrasonic waves, either of the ultrasonic beam radiated toward the object or the reflected waves is made to converge while the other is made to diverge. As shown in FIG. 2, for example, by means of the time control which employes the delay lines, the transmitted ultrasonic beam from a plurality of vibrators 22 is made to converge, and its reflected wave is received by a vibrator 24 which posesses a wide sensitivity distribution. Or, as shown in FIG. 3, an ultrasonic beam with a spread greater than a prescribed value is radiated by a vibrator 26, and the reflected waves from the object are received with a plutrality of vibrators 28 so as to converge by means of time control with the delay lines.

Accordingly, in the device shown in FIG. 2, the ultrasonic waves radiated become strong and the SN ratio is improved, since the ultrasonic waves are radiated using a plurality of vibrators and they are converged. Also, in the device shown in FIG. 3, too, the reflected ultrasonic waves are received with a plurality of vibrators 28 and are added together so that the signals received are strong and the SN ratio is improved.

Next, the resolution by the scanning principle in accordance with the present invention will be explained.

Figure 3:
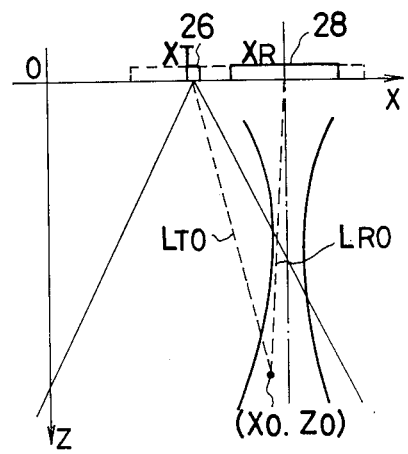

Let the coordiates of the transmission of ultrasonic waves of the vibrator 26 in FIG. 3 be $(x_T, 0)$, and the coordinates of the receiving point by the vibrator 28 in FIG. 3 be $(x_R, 0)$. If the ultrasonic wave radiated is represented by $$P_T(t) \cos wt$$

$$P_T(t) = 1 \ldots \text{for } 0 \leq t \leq T$$
$$\phantom{P_T(t) =} 0 \ldots \text{otherwise,}$$

and if the pressure distribution of the ultrasonic wave at the depth Z in the region of the imaging object is called $B_T(X, Z_0)$, and the distribution of the sensitivity of the receiving system at the same depth $Z_0$ is called $B_R(x, z_0)$, the signal obtained by receiving the reflected wave from a point reflector located at $(x, z_0)$ at the depth $Z_0$, namely, the received signal $E(t, x)$, is given by the following.

$$E(t,x) = C_O \cdot B_T(x_T - x_O, z_O) \cdot B_R(x_R - x_O, z_O) \cdot \quad (1)$$

$$P_T\left(t - \frac{L_{TO} + L_{RO}}{V}\right) \cdot \cos\left\{\omega\left(t - \frac{L_{TO} + L_{RO}}{V}\right)\right\}$$

In the above equation, $L_{TO}$ is the distance between the transmitting point of the ultrasonic wave and the point reflector, $L_{RO}$ is the distance between the reception point of the ultrasonic wave and the point reflector, V is the propagation velocity (sound velocity) of the ultrasonic waves, and $C_0$ is a constant. In order to process such a received signal by the aperture synthesis method, the signal is phase detected, for example, to take out its quadrature components. These quadrature components consists, for instance, of the sine and cosine components which can be shown to be $$H_C(x_T) = C_1 \cdot B_T(x_T - x_O, z_O) \cdot B_R(x_R - x_O, z_O) \cdot \quad (2)$$

$$P_T \cdot \cos\left(\omega \cdot \frac{L_{TO} + L_{RO}}{V}\right)$$

$$H_S(x_T) = C_1 \cdot B_T(x_T - x_O, z_O) \cdot B_R(x_R - x_O, z_O) \cdot \quad (3)$$

$$P_T \cdot \sin\left(\omega \cdot \frac{L_{TO} + L_{RO}}{V}\right)$$

In the above, there is set $$P_T = P_T\left(t - \frac{L_{TO} + L_{RO}}{V}\right)$$

in order to avoid unnecessary complication. Also, $C_1$ represents a constant. The hologram can be represented as a complex number H(x), using the components as shown by the above equations (2) and (3), as given below.

$$\begin{aligned}H(x_T) &= H_C(x) - jH_S(x) \quad (4)\\ &= C_1 \cdot B_T(x_T - x_O, z_O) \cdot B_R(x_R - x_O, z_O)\\ &\phantom{=} P_T \cdot \exp\left[-j \cdot \omega \cdot \frac{L_{TO} + L_{RO}}{V}\right]\end{aligned}$$

The expression for $L_{TO}$, $L_{RO}$ can be approximated, for $$x_R - x_O \leq z_O$$
$$x_T - x_O \leq z_O$$

by $$L_{TO} = \sqrt{(x_T - x_O)^2 + z_O^2} \quad (5)$$
$$\simeq z_O + \frac{(x_T - x_O)^2}{2z_O}$$

$$L_{RO} = \sqrt{(x_R - x_O)^2 + z_O^2} \quad (6)$$
$$\simeq z_O + \frac{(x_R - x_O)^2}{2z_O}$$

Using those approximate expressions, Eq. (4) in the foregoing may be simplified as shown below.

$$H(x_T) = C_1 \cdot B_T(x_T - x_O, z_O) \cdot B_R(x_R - x_O, z_O) \cdot P_T \cdot \exp[-j\phi] \quad (7)$$

$$\exp\left[-j \cdot \frac{A}{2}(x_T - x_O)^2\right] \cdot \exp\left[-j \cdot \frac{A}{2}(x_R - x_O)^2\right]$$

$$\phi = 4\pi z_O/\lambda$$

$$A = 2\pi/\lambda z_O$$

For such a hologram, the signal processing by the aperture synthesis method can be accomplished, when the transmitted ultrasonic beam has a spread, by performing the following convolution with $$\exp\left[j \cdot \frac{A}{2} x_T^2\right]$$

as the kernel, and by taking the absolute value of the result. Namely, the reconstructed image $U(x_R)$ of the reflector is given by the following.

$$U(x_R) = \left| \int_{-\infty}^{\infty} H(x) \cdot \exp\left[ j \cdot \frac{A}{2} (x_R - x_T)^2 \right] dx_T \right| \quad (8)$$

The above can be transformed and rearranged as follows.

$$U(x_R) = | C_1 \cdot B_R(x_R - x_0, z_0) \cdot \quad (9)$$

$$\int_{-\infty}^{\infty} B_T(x_T - x_0, z_0) \cdot \exp[-jA(x_R - x_0) \cdot x_T] dx_T |$$

From Eq. (9), it can be seen that the reconstructed image $U(x_R)$ of the point reflector located at the coordinates ($x_0$, $z_0$) as obtained by the aperture synthesis method is the product of the Fourrier transforms of the sensitivity distribution of the reception system and the sound pressure distribution of the transmission system. For example, if the sound pressure distribution is represented by a quadrature function rect (x/D)

which shows that it is a beam with certain spread, then its Fourier transform is a sinc function, and the above reconstructed image $U(x_R)$ is given by the following.

$$U(x_R) = \left| C_1 \cdot B_R(x_R - x_0, z_0) \cdot \frac{\sin \frac{A}{2} D \cdot (x_R - x_0)}{\frac{A}{2} (x_R - x_0)} \right| \quad (10)$$

However, in the existing method in which the focusing control is carried out by both of the transmission and reception, it was possible to attain a high resolution only in the vicinity of the focal point. In contrast, in the present invention, as will be shown shortly, it is possible to achieve a high resolution over a wide range in the direction of the distance or depth. In Eq. (10) above, there are included two factors, namely, the second and the third factors, that determine the reconstructed image. Of the two factors, the second factor represents the sensitivity characteristics of reception which is focused at the covering point but has a spread at a distance away from the converging point. Accordingly, if the resolution is defined in accordance with the spread, then the resolution will be at the depth corresponding to the converging point, but it has a low value for other depths. However, the resolution $\delta x$ as determined by the third factor of Eq. (10) is given by $$\delta x = \lambda z_0 / D \quad (11)$$

Here, the resolution is defined as the distance from the center of the main lobe to the first zero. In the present embodiment, the ratio $z_0/D$ remains constant since the spread D of the transmitted ultrasonic beam shown in Eq. (11) is proportional to the depth. It can be seen from this that the resolution $\delta x$ is constant independent of the depth $z_0$. That is, according to the present invention, it becomes possible to obtain a high resolution over a wide range in the direction of the distance, as is demonstrated by the third factor of Eq. (10).

It may be mentioned that, although in the above explanation for the resolution it was discussed for the case in which the sensitivity distribution for the reception system is converged, a similar result will be obtained for the case in which the sensitivity distribution is allowed a spread and the ultrasonic beam in the transmission system is converged.

Furthermore, an example was given in the foregoing for the processing according to the aperture synthesis method by using a convolution as shown in Eq. (8). However, processing based on another aperture synthesis method, for example, a means of applying to the received signal the phase matching corresponding to the propagation time of the ultrasonic wave, and then adds the signals can also be applied to the present invention, obtaining a similar result.

Next, the concrete construction of an ultrasonic imaging device in accordance with the present invention will be explained.

In what follows, an explanation will be given for the device in which the transmitted ultrasonic beam is converged and its reflected wave is received with the distribution of the reception sensitivity that has a spread greater than a predetermined value.

This ultrasonic imaging device comprises an ultrasonic probe 32 which transmits and receives ultrasonic waves, a driving unit 34 which drives the ultrasonic probe 32, a processing unit 36 which processes the signals received from the ultrasonic probe 32 to obtain the reconstruction data, and a display unit 38 which displays the reconstruction data. The driving unit 34 comprises a pulser 40 and a scan controller 42, and the processing unit 36 comprises a receiver 44, a phase detector 46, A/D converters 48 and 50, a cosine input buffer 52, a sine input buffer 54, a computer 56, and an image memory 58. The display unit 38 comprises a buffer 60, a D/A converter 62, a timing controller 64, and a CRT montor 66.

The ultrasonic probe 32 includes a vibrator array which has a plurality of ultrasonic vibrators arranged linearly. The pulser 40 is for driving each vibrator which, in synchronism with the pulse from the scan controller, sends driving pulser to the vibrators designated by the scan controller 42. The scan controller 42 outputs to the pulser 40 time-controlled pulse signals which cause the ultrasonmic beam radiated, according to the control signal from the computer 56, to converge. The vibrators are driven by the pulse signals in a manner that they are switched sequentially with a certain period, thereby shifting in succession the transmitting point of the ultrasonic beam for the living body.

The reflected wave from the living body of the ultrasonic wave transmitted by the probe 32 is received by the probe 32 and is converted to an electrical signal. Here, the resonance frequencies of each ultrasonic vibrator of the probe 32 are set to be in the range between 1 to 10 MHz.

The reception of the reflected waves is carried out over the range of N number of vibrators in the neighborhood of the transmitting position of the ultrasonic wave. In other words, the transmission of the ultrasonic wave is repeated for (2N+1) times for a certain fixed position, and the reception of the reflected wave is carried out for (2N+1) times by changing the receiving position corresponding to the transmission. Here, the value for N is determined according to the spread of the reception sensitivity for each vibrator. The received signal obtained at the probe 32 is amplified to the required level by the receiver 44. The degree of amplification is established at a required value corresponding to the level of the received signal input.

The phase detector 46 carries out the phase detection by multiplying the signal received from the receiver 44 by each of the two sinusoidal waves with phases differing by 90° that are supplied by the scan controller 42. The frequency of these sinusoidal waves coincides with the resonance frequency for the vibrators. At the output of the phase detector 46 there are obtained the quadrature components, namely, the cosine hologram component Rc and the sine hologram component Rs. They are inputted to the A/D converters 48 and 50 (C-ADC and S-ADC), respectively, in the next stage. The C-ADC 48 and the S-ADC 50 samples the cosine component Rc and the sine component Rs, respectively, to digitize them. In performing this operation, the sampling pitch is determined by considering the duration of the reflected waves from the point reflectors within the living body. Thus, for example, if the duration is 2 $\mu$sec, then it will be sufficient to choose the sampling pitch at about one fifth of the duration or 400 $\mu$sec. The sampling pitch is determined by the sampling clock which comes from the scan controller 42, and the sampling and the digitization are executed synchronously to the clock signal. In this manner, both of the cosine component Rc and the sine component Rs are digitized as 8-bit signals.

The digitized cosine component and the sine component are stored in a cosine input buffer memory 52 and the sine input buffer memory 54, respectively. The loading of the data to these memories 52 and 54 is carried out synchronized with the sampling clock which is provided also to the C-ADC 48 and the S-ADC 50. That is, the digitized quadrature components (the cosine and the sine components) are loaded in succession into the input buffer memories 52 and 54 synchronous with the sampling clock. The input buffer memories 52 and 54 have necessary capacity to store the received signals corresponding to a series of reflected signals obtained by the radiation of a single ultrasonic pulse. The stored data is read out by the computer 56 subsequent to the completion of the loading, and is then transferred to the picture memory 58.

The picture memory 58 is capable of storing the data for two pictures. This is for storing the cosine and the sine components that are read out from the cosine input buffer memory 52 and the sine imput buffer memory 54. The construction of the regions for storing the Rc and the Rs components in the picture memory 58 is such that the x and y addresses that correspond to the scanning direction and the depth direction, respectively, can take on values between 0 and 511. Each address is capable of storing on 8-bit data. In this way, when all of the hologram data obtained by the reception for (2N+1) times of the reflected wave corresponding to a single transmitting position is stored in the picture memory 58, the computer 56 begins to perform on these hologram data the aperture synthesis process as represented by Eq. (8) shown earlier.

The output buffer memory 60 is for storing the picture data for the composite picture relating to the composition within the living body obtained as a result of the operation at the computer 56. The output buffer memory 60 is read out constantly synchronized with the clock signal from the time controller 64. The reading out is carried out matching with the scanning at the CRT monitor 66. The time controller 64 generates the synchronous signals for the television and the data readout control signals for displaying on the CRT monitor 66 the picture data that are stored in the output buffer memory 60.

The picture data from the output buffer memory 60 is converted to an analog picture signal by the D/A converter 62 and is mixed with the synchronous signal from the timing controller 64. The mixed output which is the composite video signal is inputed to the CRFT monitor 66, and the composite picture is displayed. The functions of the computer 56 are the following three; (1) Control of the scan controller 42, (2) transfer of the data for the digital quadrature components, and (3) composite processing of the picture.

The control of the controller 42 is carried out, for example, by giving an instruction for radiation of the ultrasonic wave whenever the transfer to the picture memory 58 of the hologram data, obtained from the buffers 52 and 54 corresponding to a single transmission of an ultrasonic wave, is completed. The transfer and control of the hologram data are carried out by transferring the hologram data which has been stored in the buffer memories 52 and 54 to the address locations of the picture memory 58 that correspond to the receiving positions (scanning positions) and the depth of the reflected waves. Following this, when all of the hologram data for the reception of (2N+1) times are stored in the picture memory 58, the first processing for the picture reconstruction is initiated. The processing process from a shallow section to a deeper section in succession along the direction of depth.

In the following, there will be explained the processing steps for picture reconstruction. First, at step 100 the computer 56 reads out from the picture memory 58 the first row of the hologram data led by the address (0, 0). Next, in step 110, the computer 56 reads out the kernal data which corresponds to the hologram data that has been read out, from among the kernal data that had been stored beforehand in the memory of the computer 56. In step 120, multiplication and summation are performed for the hologram data and the kernel data. Then, in step 130, the absolute value is taken of the result of the multiplication and summation, and in step 140 the absolute value is stored at an address in the buffer memory 60 that corresponds to the transmitting position and the depth. Next, in step 150, the kernal data is shifted so as to have its head to correspond to the hologram data at the address (1, 0), and carry out a similar computation of multiplication and summation. Repeat similar operations until the head of the kernal data corresponds to the hologram data at the address (511, 0). This completes the processing of picture synthesis for the first row. Upon completion of the picture synthesis processing for the first row (step 160), the computer 56 moves to execute a similar processing for the second row (step 170) and the result is stored in the buffer memory 60. Such a processing is carried out repeatedly until the 512th row (step 180), completing the picture synthesis processing for one picture.

It should be noted that in place of the method of finding the quadrature components for the received signal by means of the phase detection, some other measures, such as the quadrature sampling technique can also be used satisfactorily.

Figure 4:
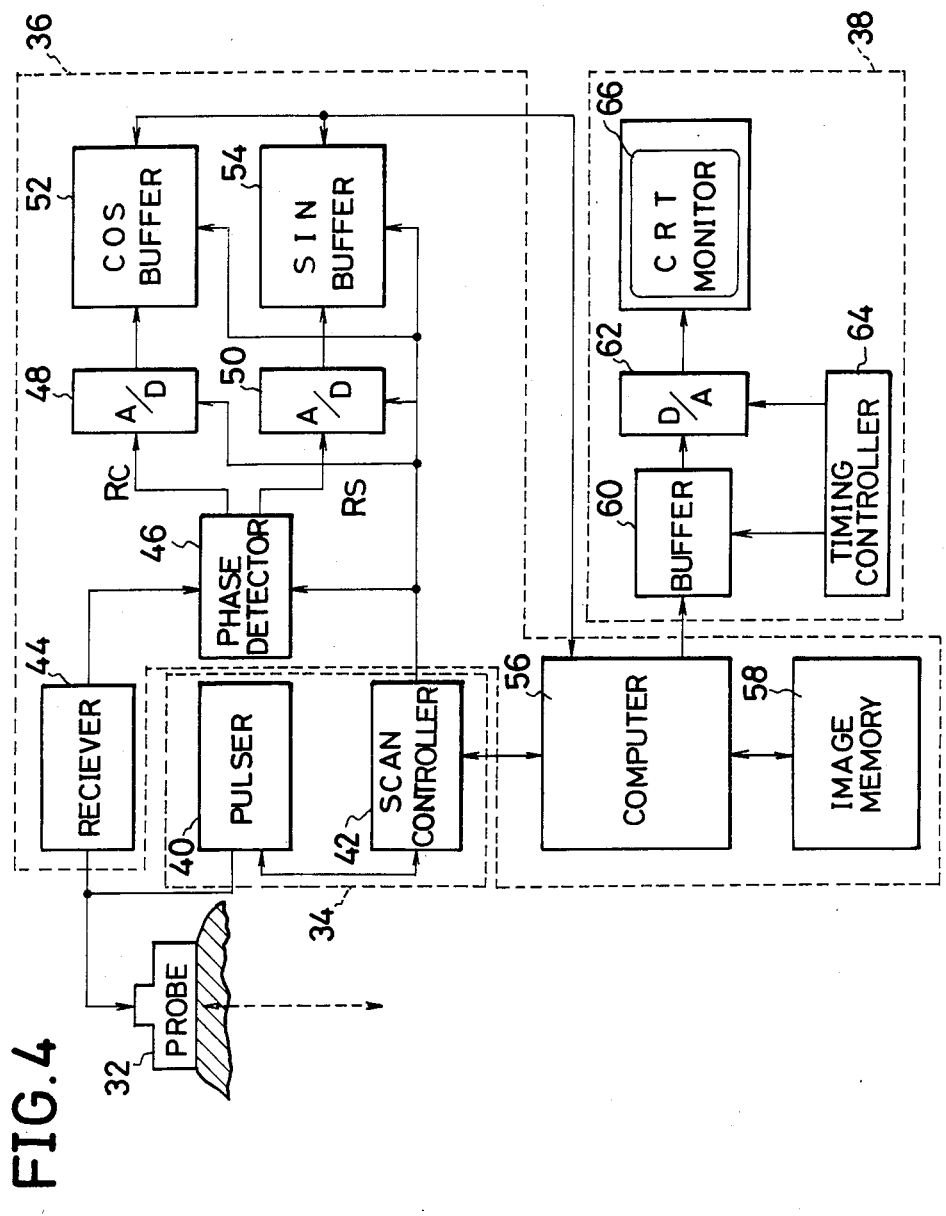
FIG. 4 is a block diagram of the ultrasonic imaging device embodying the present invention.
Figure 5B:
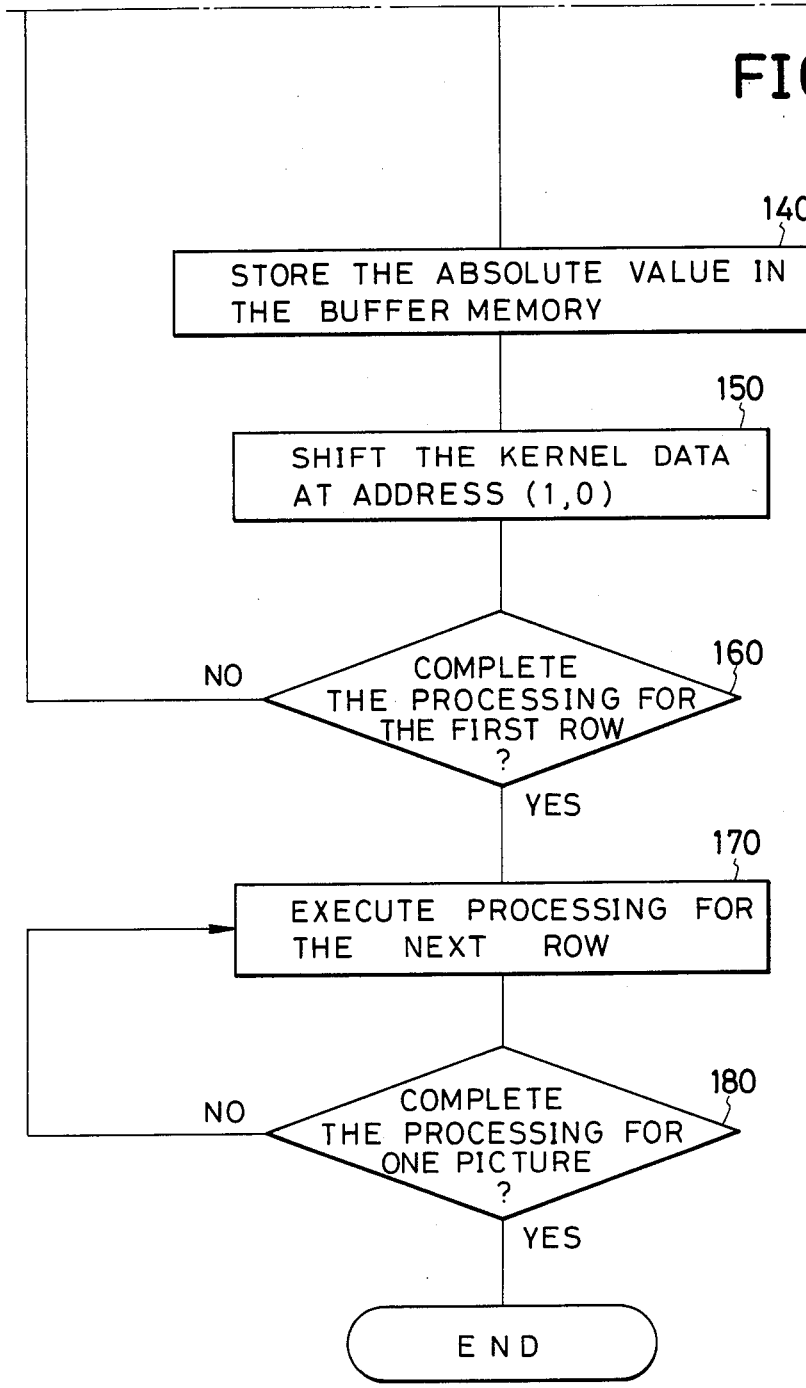
FIG. 5, which is a composite of FIGS. 5(a) and 5(b) is a flow chart for the operation of the image synthesis processing for the device shown in FIG. 4.

In addition, in the case of converging the distribution of the reception sensitivity of the reflected waves, instead of converging the transmitted wave, the operation control of the device with construction as shown by FIG. 4 is performed in the following manner. Namely, the transmission of the ultrasonic wave is carried out by radiating ultrasonic beam with spread in successive manner through switching of an energized vibrator one after another. The reflected waves are received by a plurality of vibrators, and the distribution of the reception sensitivity is converged by synthesizing the received outputs after delayed control. The control on the transmitted and received waves is so arranged as to be done, for a certain fixed receiving position, by scanning the transmitting position through energizing of each vibrator over the configuration range of (2N+1) vibrators centered around the receiving position, and then by repeating the above procedure by changing the receiving position in succession.

Moreover, the signal processing based on the aperture synthesis method makes it possible to find the reconstructed signal by carrying out the operation represented by Eq. (8) on the hologram data obtained by the (2N+1) times of transmission corresponding to one receiving position.

Furthermore, in the conventional aperture synthesis in which transmission of the ultrasonic wave is carried out for plural times or in the case of using an ultrasonic wave with spread for the present invention, the reconstructed result for a point reflector is computed based on the hologram data obtained by plural times of transmission of the ultrasonic wave. Therefore, it becomes impossible to obtain a correct reconstruction due to changes in the hologram data if the object moves during the scan of the ultrasonic wave. However, in the set-up according to the present invention in which a convergent ultrasonic wave is transmitted and a simultaneous reception of the reflected wave is made by means of a plurality of vibrators, as shown in FIG. 2, it is possible to obtain the hologram data required for the reconstruction of the image by a single transmission of the ultrasonic wave. Accordingly, this system has a feature in that it does not give rise to a degradation of the image, as in the above, due to movement of the object.

In summary, in the image processing based on the aperture synthesis method, it becomes possible according to the present invention to obtain an image with a high resolving power and an excellent SN ratio over a wide range along the distance direction, by arranging to bring to convergence either one of the transmitted ultrasonic beam or the distribution of the reception sensitivity of the refected waves.

Various modifications will become possible for those skilled in the art after receiving the teachings of the present disclosure without departing from the scope thereof.

What is claimed is:

1. An ultrasonic imagining device for obtaining imaging information of an object by carrying out scanning of the object with ultrasonic waves, comprising:
means for transmitting ultrasonic waves and receiving the reflected ultrasonic waves from the object, said ultrasonic waves transmission and reception means being constructed to operate in a first mode in which the transmitted ultrasonic wave is converged and the received ultrasonic wave is diverged or a second mode in which the transmitted ultrasonic wave is diverged and the received ultrasonic wave is converged; and
means for processing a received reflected signal obtained from said ultrasonic wave's transmission and means for processing a received reflected signal obtained from said ultrasonic wave's transmission and reception means in order to obtain image reconstruction data for the object based on an aperture synthesis method.

2. An ultrasonic imaging device as claimed in claim 1, further comprising:
means for displaying the reconstructed image according to the image reconstruction data obtained from said processing means.

3. An ultrasonic imaging device as claimed in claim 1, in which said ultrasonic waves transmission and reception means comprises a probe with a plurality of vibrators and means for driving and controlling the vibrators of the probe so as to operate in said first mode in which the transmitted ultrasonic wave is converged and the received ultrasonic wave is spread greater than a predetermined value or a second mode in which the transmitted ultrasonic wave is spread greater than a predetermined value and the received ultrasonic wave is converged.

4. An ultrasonic imaging device as claimed in claim 3, in which said probe driving and controlling means drives and controls said plurality of vibrators by means of time control which employs delay lines.

5. An ultrasonic imaging device as claimed in claim 3, in which said probe driving and controlling means is constructed to drive and control a plurality of vibrators so as to transmit divergent ultrasonic waves with a predetermined spread and receive convergent reflected waves.

6. An ultrasonic imaging device as claimed in claim 3, in which said probe driving and controlling means controls the vibrators so as to move the transmitting position of the ultrasonic waves and the receiving position of the reflected waves systematically in succession.

7. An ultrasonic imaging device as claimed in claim 3, in which convergent ultrasonic waves are transmitted and reflected waves are simultaneously received by means of the plurality of vibrators in order to obtain hologram data used for the reconstruction of the image by a single transmission of the ultrasonic waves.

8. An ultrasonic imaging device for obtaining imaging information of an object by carrying out scanning of the object with ultrasonic waves, comprising:
means for transmitting ultrasonic waves and receiving the reflected ultrasonic waves from the object, said ultrasonic waves transmission and reception means being constructed to operate in a first mode in which the transmitted ultrasonic wave is converged and the received ultrasonic wave is diverged or a second mode in which the transmitted ultrasonic wave is diverged and the received ultrasonic wave is converged;
means for processing a received reflected signal obtained from said ultrasonic wave's transmission and reception means in order to obtain image reconstruction data for the object based on an aperture synthesis method;
wherein said ultrasonic waves transmission and reception means comprises a probe with a plurality of vibrators and means for driving and controlling the vibrators of the probe so as to operate in said first mode in which the transmitted ultrasonic wave is converged and the received ultrasonic wave is spread greater than a predetermined value or a second mode in which the transmitted ultrasonic wave is spread greater than a predetermined value and the received ultrasonic wave is converged.

9. An ultrasonic imaging device as claimed in claim 8 wherein said probe driving and controlling means drives and controls a plurality of vibrators by means of time control which employs delay lines so as to converge either one of the transmitted ultrasonic waves or received ultrasonic waves.

10. An ultrasonic imaging device for obtaining imaging information of an object by carrying out scanning of the object with ultrasonic waves, comprising:
   means for transmitting ultrasonic waves and receiving the reflected ultrasonic waves from the object, and ultrasonic waves transmission and reception means being constructed to operate in a first mode in which the transmitted ultrasonic wave is converged and the received ultrasonic wave is diverged or a second mode in which the transmitted ultrasonic wave is diverged and the received ultrasonic wave is converged;
   means for processing a received reflected signal obtained from said ultrasonic wave's transmission and reception means in order to obtain image reconstruction data for the object based on an aperture synthesis method; and
   wherein said processing means comprises a receiver for amplifying the received reflected signal to a required level to provide an amplified signal, a phase detector for phase detecting the amplified signal from the receiver and obtaining the quadrature components thereof to provide a phase-detected signal, an A/D converter for digitizing the phase-detected signal and providing digitized cosine and sine component signals, a cosine input buffer and a sine input buffer for storing the digitized cosine and sine component signals, respectively, a picture memory for storing data stored in said cosine and sine input buffers, and a computer for transferring the data which are stored in said cosine input buffer and sine input buffer to said picture memory and carrying out operations for aperture synthesis.

11. An ultrasonic imaging device as claimed in claim 10, further comprising displaying means which includes an output buffer for storing synthesized picture data obtained as a result of computer operations, a CRT monitor for displaying the synthesized picture data, a timing controller for generating a synchronous television signal and a data read-out control signal for displaying on the CRT monitor the picture data stored in the output buffer, and a D/A converter for converting the picture data from the output buffer to an analog signal, and outputting said analog signal to the CRT monitor.

* * * * *